Oct. 1, 1935.   S. S. BLOCHER   2,015,916
CRESCENT SHAPE TWO-EDGE HOE
Filed Jan. 9, 1935
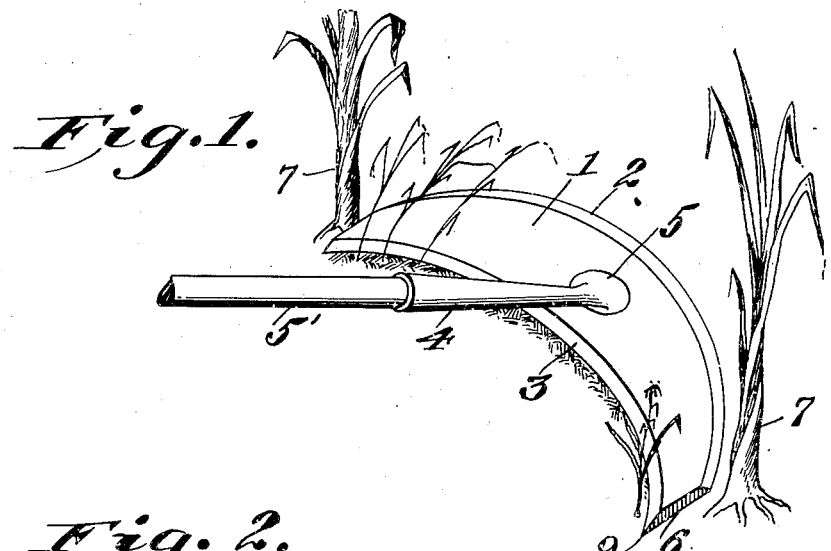
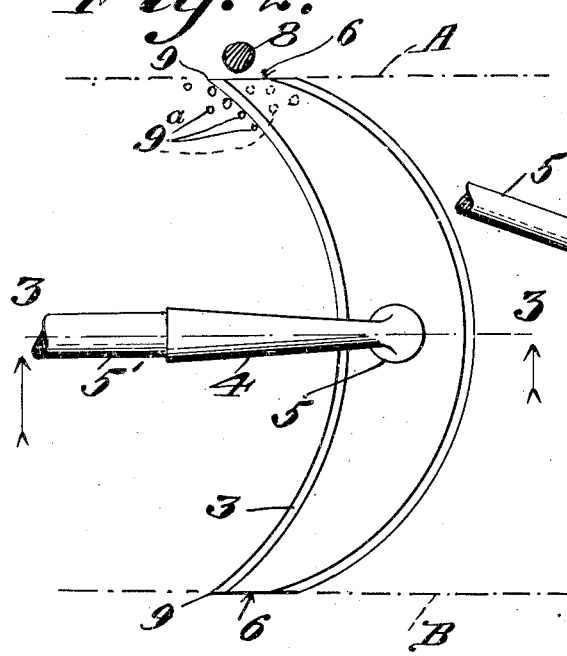
INVENTOR,
Samuel S. Blocher.
BY
E. E. Vrooman & Co.,
His ATTORNEYS.

Patented Oct. 1, 1935

2,015,916

UNITED STATES PATENT OFFICE 2,015,916

CRESCENT-SHAPE TWO-EDGE HOE

Samuel S. Blocher, York, N. Dak., assignor of one-half to Nelson Jaques, Knox, N. Dak.

Application January 9, 1935, Serial No. 1,061

2 Claims. (Cl. 97—68)

This invention relates to improvements in hoes, and more particularly to a novel and efficient crescent-shape two-edge hoe.

An object of my invention is the construction of a crescent-shape two-edge hoe, which will have a cutting action during the forward and rearward, or back and forth movement of the hoe, cutting close to the plant for destroying weeds, without injuring the plant.

Another object of my invention is the construction of a novel hoe that is very efficient in operation because of the closeness that the user can work to a plant or plants without injuring the same.

A still further object of my invention is the construction of a hoe that can be moved back and forth with a cutting or digging action, and which has comparatively blunt ends, for safeguarding the plant during operation, without minimizing the area of ground worked over by the user of my improved hoe.

With the foregoing and other objects in view, my invention comprises certain novel constructions, combinations and arrangements of parts as will be hereinafter fully described, illustrated in the accompanying drawing, and more particularly pointed out in the appended claims.

In the drawing:

Figure 1 is a perspective view of my improved hoe, while

Figure 2 is a top plan view of the same.

Figure 3 is a sectional view taken on line 3—3, Figure 2 and looking in the direction of the arrows.

Referring to the drawing by numerals, I designates the crescent-shaped blade which has a comparatively broad front bevelled cutting edge 2 and a similar rear cutting edge 3. The edge 2 is for cutting or working the soil during the forward movement or "push" of the tool, while the rear cutting edge 3 is for similar purpose when the operator pulls back, or on the rearward movement of the tool. A suitable handle socket 4 is secured at 5 to the blade I, preferably near its center, and a wood handle 5 is preferably inserted into the handle socket 4. The handle socket 4 may be secured at 5 to the blade I by soldering or welding or by screws (not shown) as the constructor desires.

The blunt vertical ends 6 are formed on lines "A" and "B", Fig. 2; in other words, these non-plant injuring ends are in parallelism, so that the tool can work efficiently between plants 7, 7, as shown in Fig. 1, or the tool can pass very closely to plant 8 (Fig. 2), removing all weeds 9a, without injuring the plant, whether the hoe is thrust forward or outwardly, or pulled inwardly or rearwardly. Thus I have produced a quick-acting hoe, so to speak, which no other hoe is capable of doing up to the time of my invention.

The capacity of working action of either of the double cutting edges of my blade is the same, because each cutting edge extends to the blunt or "vertical" edges 6. Hence, it will be seen that either upon the thrusting forward or the pulling back of the blade performs an efficient action on the soil that is being worked, or in removing weeds or foreign frowth on land, or around plants during the cultivation thereof.

My improved blade is perfectly flat, giving the true position of the double crescent-shape cutting edges, together with the novel structure of the straight parallel blunt ends.

These blunt ends 6 and the inner bevelled edge 3 produce sharp cutting points 9 at each end of the inner cutting edge 3 of the blade, which points 9 may be used as a digger, or for any other purpose that the operator desires. Therefore, it will be noted that the parallel ends 6 of my improved hoe produce two advantages, in that I can work close to a plant as shown, without injuring the same during the quick forward and back thrusts and, secondarily, these ends produce said cutting points 9 for certain purposes that the operator may utilize the hoe for.

Only with a hoe of the peculiar and novel structure herein shown and described can an operator work or cultivate around a plant, or between plants, for the maximum result, without injuring the plant or plants.

While I have described the preferred embodiment of my invention and illustrated the same in the accompanying drawing, certain minor changes or alterations may appear to on skilled in the art to which this invention relates during the extensive manufacture of the same, and I, therefore, reserve the right to make such changes or alterations as shall fairly fall within the scope of the appended claims.

What I claim is:

1. As a new article of manufacture, a crescent-shape blade flat throughout its entire length and provided with parallel blunt ends, said blade also provided with an inner and an outer cutting edge, and said blunt ends and inner cutting edge producing sharp cutting points at the ends of said inner cutting edge.

2. As a new article of manufacture, a crescent-shape flat blade provided with parallel straight blunt ends, said ends of the same height as the thickness of the blade, said blade also provided with an outer deep bevelled edge and with an inner deep bevelled edge, said edges having substantially the same cutting action during the movement of the blade both forwardly and rearwardly, said inner cutting edge and said blunt parallel ends forming sharp cutting points at the ends of the inner edge, and a handle connected to said blade, substantially as shown and described.

SAMUEL S. BLOCHER.